US012780067B2

(12) United States Patent
Smith et al.

(10) Patent No.: US 12,780,067 B2
(45) Date of Patent: Nov. 3, 2026

(54) VEHICLE SEAT ARMREST

(71) Applicant: Lear Corporation, Southfield, MI (US)

(72) Inventors: Lea Thomas Smith, Severna Park, MD (US); Zhengda Mao, Yang Pu (CN); Thomas Loyal Sundberg, Jr., Commerce Township, MI (US); Liting Shen, Pudong New Area (CN); Jochen Kohlhofer, Altfraunhofen (DE); Jasmine Pizana, Rochester Hills, MI (US); Mark Steven Sparschu, Birmingham, MI (US)

(73) Assignee: Lear Corporation, Southfield, MI (US)

( * ) Notice: Subject to any disclaimer, the term of this patent is extended or adjusted under 35 U.S.C. 154(b) by 61 days.

(21) Appl. No.: 17/980,811

(22) Filed: Nov. 4, 2022

(65) Prior Publication Data

US 2024/0149770 A1 May 9, 2024

(51) Int. Cl.
*B60N 2/75* (2018.01)

(52) U.S. Cl.
CPC ............. *B60N 2/793* (2018.02); *B60N 2/753* (2018.02)

(58) Field of Classification Search
CPC .... B60N 2/753; B60N 2/793; B60R 13/0243; B60R 13/0237; B60R 2013/0287; B60J 5/0493
USPC ..................................... 296/1.09, 37.15, 153
See application file for complete search history.

(56) References Cited

U.S. PATENT DOCUMENTS

| | | | | | |
|---|---|---|---|---|---|
| 4,052,103 | A | | 10/1977 | Steinthal | |
| 4,417,764 | A | * | 11/1983 | Marcus | B60N 2/793 297/188.17 |
| 4,783,037 | A | * | 11/1988 | Flowerday | B60N 3/106 297/188.17 |
| 5,074,617 | A | | 12/1991 | Maxwell | |
| 5,104,184 | A | | 4/1992 | Kwasnik et al. | |
| 5,232,190 | A | * | 8/1993 | Gould | B60N 3/102 248/118 |
| 5,752,740 | A | | 5/1998 | Volkman et al. | |
| 5,853,220 | A | | 12/1998 | Gulich et al. | |
| 5,897,089 | A | * | 4/1999 | Lancaster | B60N 3/106 297/188.17 |
| 6,027,164 | A | | 2/2000 | Jakubiec et al. | |
| 6,217,112 | B1 | * | 4/2001 | Linsenmeier | B60N 3/108 297/217.3 |
| 6,508,508 | B1 | | 1/2003 | Bargiel | |
| 6,619,738 | B1 | | 9/2003 | Filipovich | |
| 7,025,316 | B2 | * | 4/2006 | Schaal | B60N 3/102 248/312 |

(Continued)

FOREIGN PATENT DOCUMENTS

| | | | | |
|---|---|---|---|---|
| DE | 102014106947 A1 | | 11/2015 | |
| DE | 102017101428 A1 | * | 7/2017 | A47C 7/624 |

(Continued)

OTHER PUBLICATIONS

Machine Translation of DE102017101428 (Year: 2024).*

(Continued)

*Primary Examiner* — Jason S Morrow
(74) *Attorney, Agent, or Firm* — MacMillan, Sobanski & Todd, LLC

(57) ABSTRACT

An armrest employed with a vehicle seat assembly that includes a storage compartment in the armrest that is accessible by moving a storage cover relative to the armrest.

17 Claims, 8 Drawing Sheets

(56) References Cited

U.S. PATENT DOCUMENTS

| | | | | |
|---|---|---|---|---|
| 7,287,885 | B2 * | 10/2007 | Radu | B29C 45/0017 362/154 |
| 8,573,552 | B2 * | 11/2013 | Andersson | B60N 3/102 248/311.2 |
| 10,189,415 | B2 * | 1/2019 | Kang | B60R 7/046 |
| 10,220,749 | B2 * | 3/2019 | Stiver | B60N 2/793 |
| 10,793,081 | B2 * | 10/2020 | Tena Han | B60R 11/02 |
| 11,866,010 | B2 * | 1/2024 | Dessapt | H02J 50/10 |
| 2013/0300144 | A1 | 11/2013 | Rose | |
| 2017/0028934 | A1 * | 2/2017 | Hélot | H02J 7/0045 |
| 2018/0208089 | A1 * | 7/2018 | Harris | B60N 2/793 |
| 2019/0126791 | A1 | 5/2019 | Prezecki, II | |
| 2020/0101886 | A1 * | 4/2020 | Shibata | H02J 50/10 |
| 2020/0354063 | A1 * | 11/2020 | Satterfield | B64D 11/0636 |
| 2021/0121344 | A1 | 4/2021 | Lee et al. | |
| 2023/0415625 | A1 * | 12/2023 | Smith | B60R 7/043 |

FOREIGN PATENT DOCUMENTS

| | | | | | |
|---|---|---|---|---|---|
| KR | 20140053767 | A | * | 5/2014 | B60N 2/793 |
| KR | 1020140053767 | A | | 5/2014 | |
| KR | 200486896 | Y1 | * | 7/2018 | A47C 17/02 |

OTHER PUBLICATIONS

Machine Translation of KR20140053767 (Year: 2024).*

German Examination Report, Application No. 102023114349.2, dated Jul. 23, 2025.

* cited by examiner

VEHICLE SEAT ARMREST

BACKGROUND OF THE INVENTION

This invention relates to a vehicle seat, and more particularly to an armrest for a vehicle seat having a storage compartment.

Armrests employed with vehicle seats are known in the art. Some armrests employed with vehicle seats may have storage compartments with lids. It is desirable to provide armrests employed with vehicle seats that provide storage compartments that are ergonomic and convenient for vehicle passengers.

SUMMARY OF THE INVENTION

According to an aspect, the invention provides a seat assembly for a vehicle that may include an armrest configured to attach to the seat assembly, which armrest includes an internal cavity defining a storage compartment, an opening adjacent to the storage compartment configured to allow for access from outside of the armrest to the storage compartment, and a storage tray extending through the opening into the internal cavity, the storage tray movable laterally between a closed position where the storage tray is mostly or all of the way inserted into the storage compartment and essentially covers the opening, and an open position where the storage tray extends from the armrest to provide access to the tray.

According to an aspect, the invention provides a seat assembly for a vehicle that may include a seatback configured to be mounted in the vehicle; and an armrest pivotally mounted to the seat assembly, which armrest includes an internal cavity defining a storage compartment, an opening adjacent to the storage compartment configured to allow for access from outside of the armrest to the storage compartment, and a storage cover pivotally attached to the armrest about a hinge having a longitudinal pivot axis when the armrest is in a deployed position, the storage cover pivotable between a closed position where the storage cover essentially covers the opening, and an open position where the storage cover extends from the armrest to provide access to the storage compartment.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
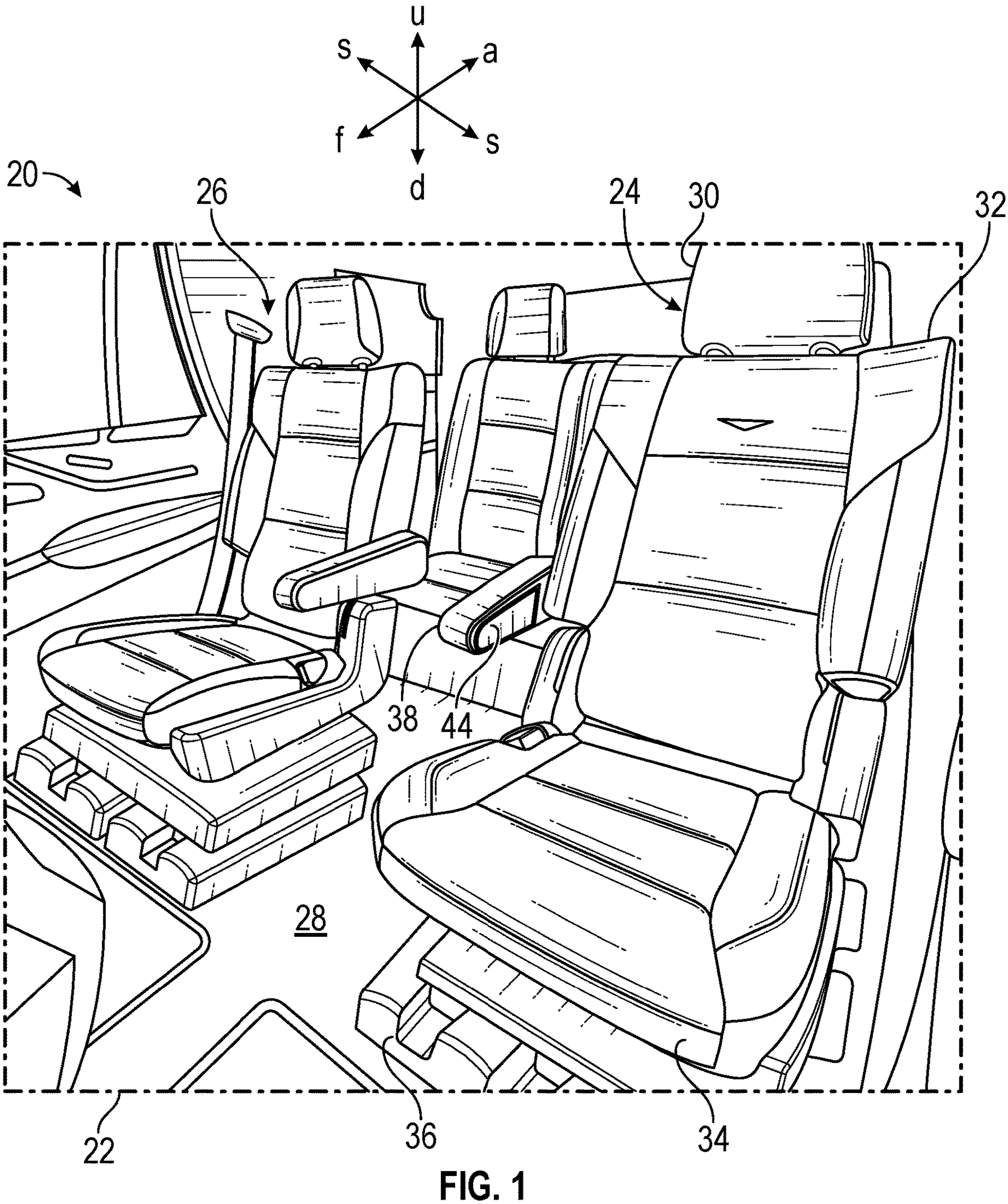
FIG. 1 is a schematic, perspective view of a portion of an interior of a vehicle.
Figure 2:
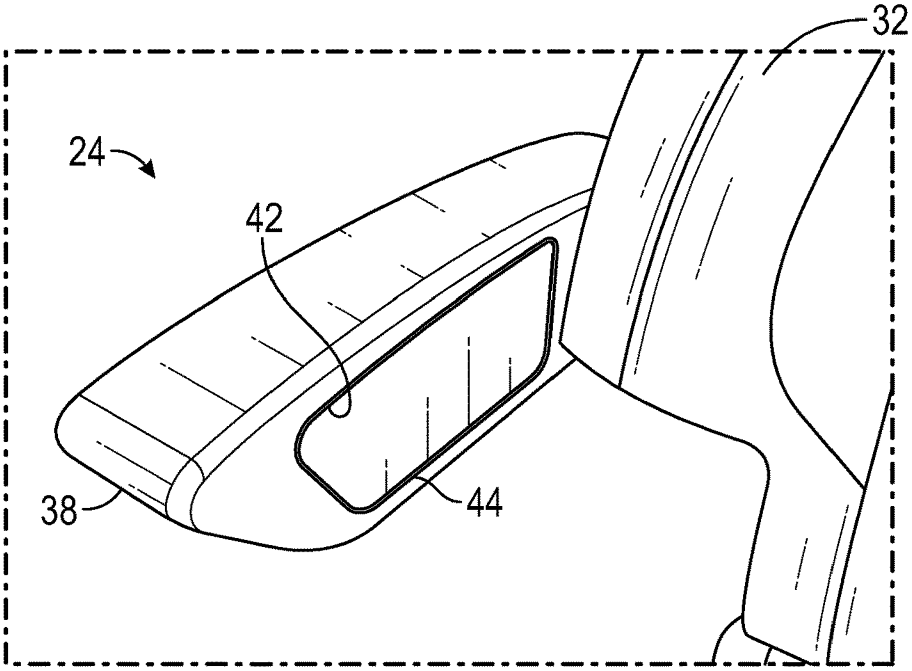
FIG. 2 is a schematic, perspective view of a portion of a vehicle seat assembly, with an armrest in a deployed position and a storage cover on the armrest in a closed position.
Figure 3:
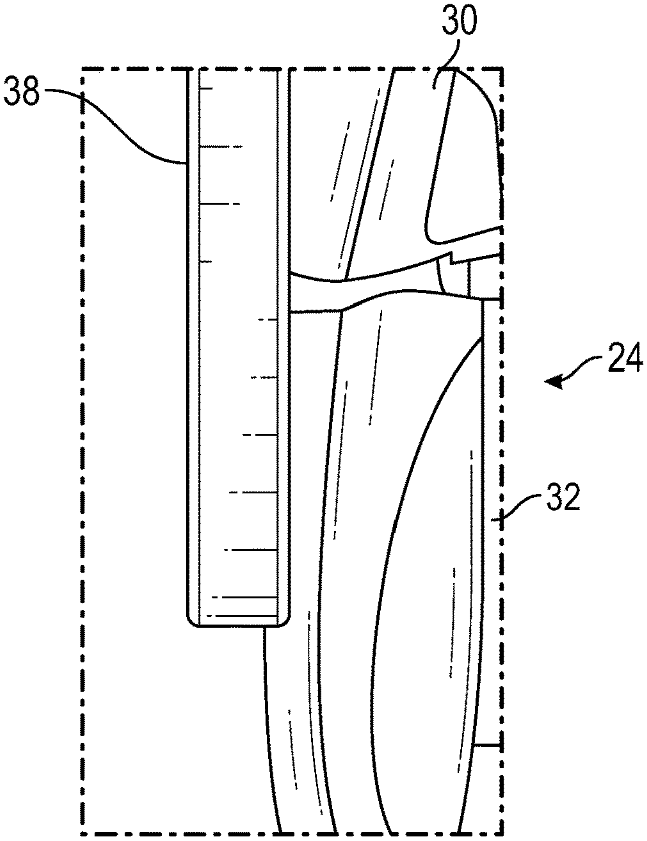
FIG. 3 is a schematic, elevation view of a portion of a vehicle seat assembly, with an armrest in a stowed position and a storage cover on the armrest in a closed position.
Figure 4:
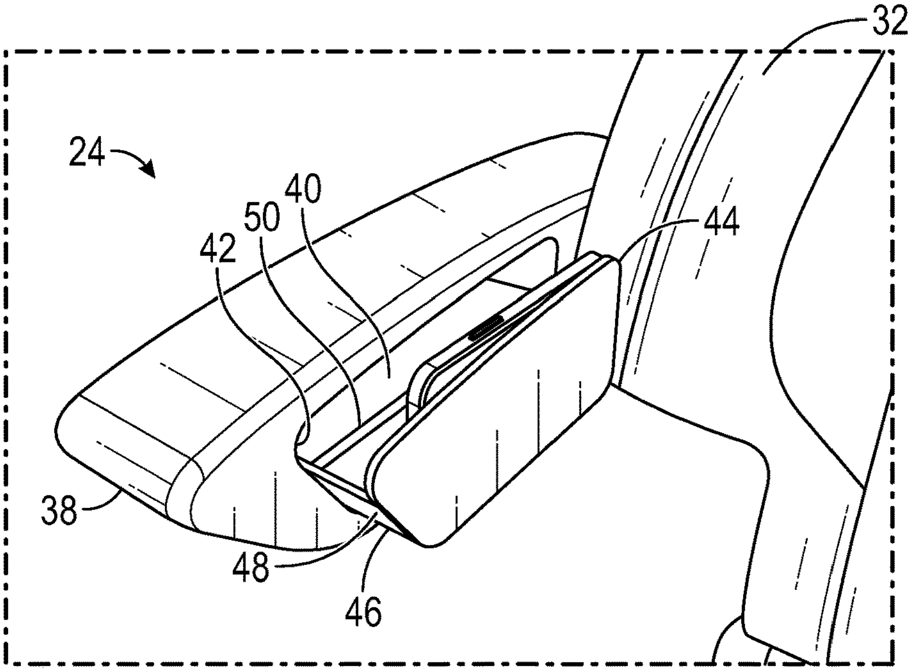
FIG. 4 is a schematic, perspective view of a portion of a vehicle seat assembly, with an armrest in a deployed position and a storage cover on the armrest in an open position.
Figure 5:
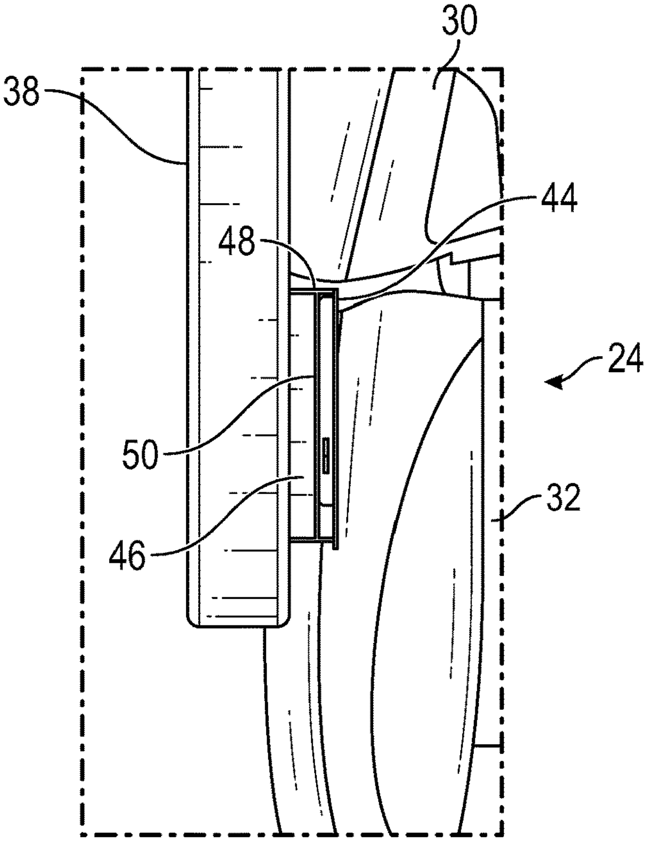
FIG. 5 is a schematic, elevation view of a portion of a vehicle seat assembly, with an armrest in a stowed position and the storage cover on the armrest in an open position.
Figure 6:
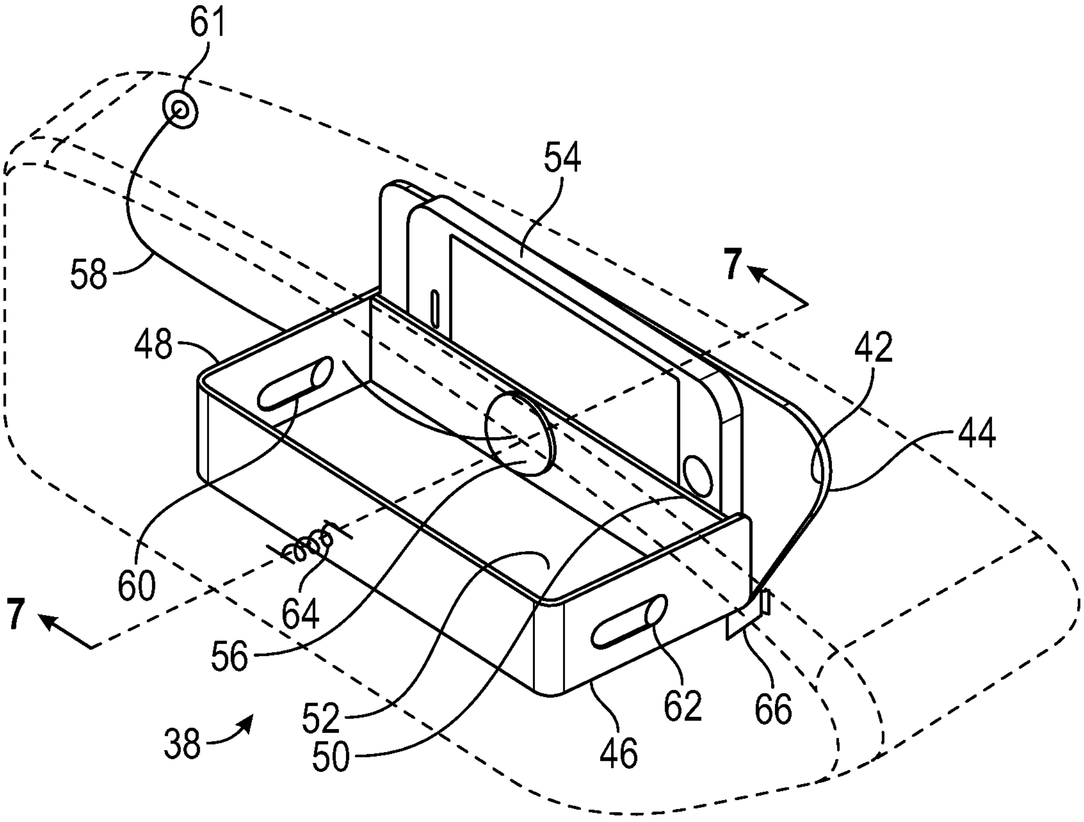
FIG. 6 is a schematic, perspective view of a portion of an armrest.
Figure 7:
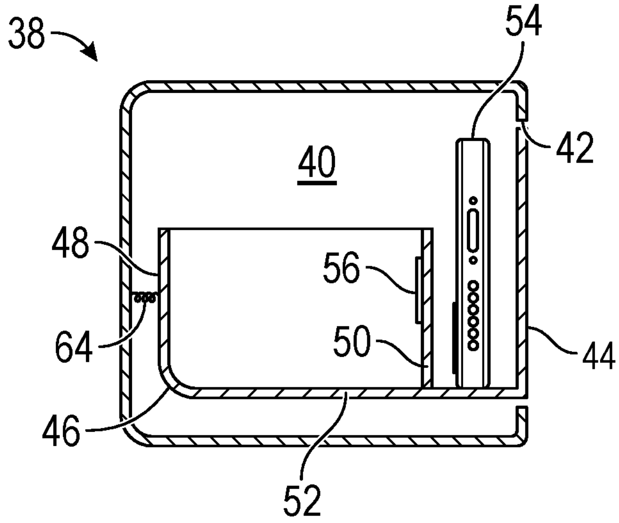
FIG. 7 is a schematic, partial cross section view of a portion of an armrest, taken from line 7-7 in FIG. 6.

Referring now to the drawings, an example is illustrated in FIG. 1 of a vehicle 20 having a vehicle interior 22, within which are mounted a vehicle seat assembly 24 and a second vehicle seat assembly 26. The vehicle seat assembly 24 and the second vehicle seat assembly 26 are secured to vehicle structure, such as a floor 28. The orientation of the seat assemblies 24, 26 are shown forward facing (i.e., facing forward towards a front of the vehicle 20 in a longitudinal direction). As used herein, the term longitudinal indicates a fore-aft direction (indicated by double-ended arrow "f-a" in FIG. 1) in the vehicle 20, the terms lateral/laterally mean in a side-to-side direction (indicated by double-ended arrow "s-s" in FIG. 1) in the vehicle (e.g., the vehicle seat assembly 24 is spaced laterally from the second vehicle seat assembly 26), and the term vertical means in an up-down direction (indicated by double-ended arrow "u-d" in FIG. 1) relative to the vehicle 20 (e.g., the floor 28 is vertically below the vehicle seat assembly 24). The vehicle seat assembly 24 and the second vehicle seat assembly 26 are illustrated as individual vehicle seat assemblies (i.e., captains chairs), where each is mounted separately in the vehicle and not directly attached to each other but may alternatively be multi-seat assemblies that are attached to each other. The vehicle seat assembly 24 and the second vehicle seat assembly 26 may be essentially mirror images of each other and so only one will be discussed further.

Referring now to the example shown in FIGS. 1-5, the vehicle seat assembly 24 includes a headrest 30 mounted on a seatback 32, which in turn is mounted on a seat bottom 34, which is mounted on a base 36, which may mount to the floor 28. The vehicle seat assembly 24 includes at least one armrest 38, pivotally mounted to a portion of the vehicle seat assembly 24, such as to the seatback 32. The armrest 38 is pivotable between a deployed position (i.e., for a seat occupant to rest an arm on, see FIGS. 1, 2 and 4) and a stowed position (i.e., pivoted generally vertically along the seatback to be out of the way of a seat occupant, see FIGS. 3 and 5). The armrest 38 includes a storage compartment 40 (i.e., a hollow interior portion) with an opening 42, which opening 42 is coverable with a storage cover 44. The storage cover 44 is illustrated completely covering the opening 42 when in a closed position (see FIGS. 1-3). The storage cover 44 is affixed to a storage tray 46, which is sized and shaped to slide laterally into and out of the storage compartment 40 through the opening 42 (see in particular FIGS. 4 and 5). The storage tray 46 as illustrated has sidewalls 48 and may have one or more storage divider walls 50. The side walls 48 assist with holding items placed within the storage tray 46 from falling out and the divider wall 50 assists with dividing the storage tray 46 into multiple areas for holding items separate from each other.

Referring now to the example shown in FIGS. 1-7, the storage tray 46 includes three sidewalls 48, one each fore and aft, and one lateral, opposite the storage cover 44. The storage tray 46 includes a bottom 52 upon which items are supported. One item may be, for example, an electronic device such as a mobile phone 54. The storage tray 46 as illustrated, then, includes a fore and aft running storage divider wall 50 that creates a gap between the storage divider wall 50 and the storage cover 44 that is about the thickness of a typical mobile phone 54. This allows for a mobile phone 54 to be placed in the storage tray 46 adjacent to the storage divider wall 50 and for the storage tray 46 to remain in the open position or slid laterally into the closed position, in which case the mobile phone 54 will be retained and hidden inside of the storage compartment 40. An electrical device 56, such as for example a USB port (or similar type of electrical connector) or a wireless charger, is illustrated mounted to (or adjacent to) the storage tray 46. For example, if the electrical device 56 is a wireless charger, it may be mounted to the storage divider wall 50 adjacent to where a mobile phone 54 may be placed. In this way, while a mobile phone 54 is retained in the storage tray 46, the mobile phone 54 may be charged. Power to the electrical device is illustrated as being provided, for example, by electrical wire(s) 58 that run from the electrical device, through the storage compartment 40 to a pivot support 61, through the pivot support 60 and into the seatback 32, and to a location where electrical power is provided in the vehicle seat assembly 24. Many vehicle seat assemblies 24 include electrically powered adjustments (e.g., seat fore-aft, seat up-down, pivoting of the seatback relative to the seat bottom), and so electrical power may already be provided to the vehicle seat assembly 24.

Figure 8:
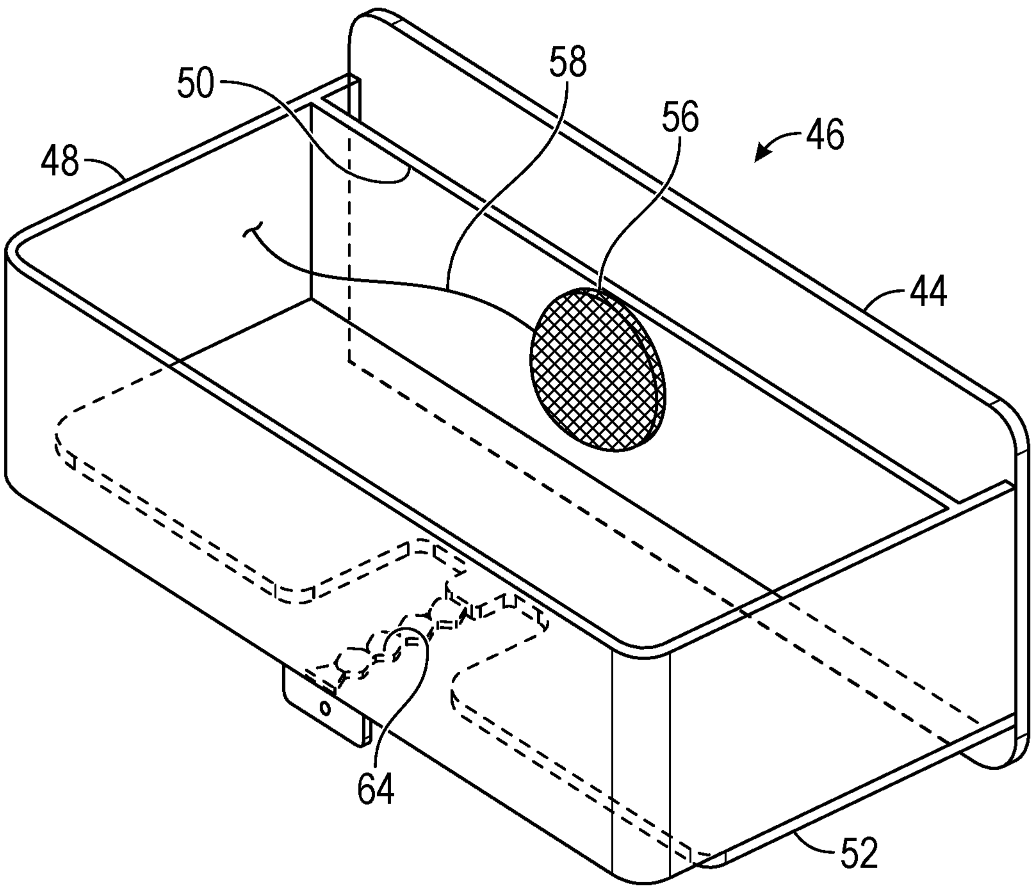
FIG. 8 is a schematic, perspective view of a portion of a storage tray.

Support for the storage tray 46 within the storage compartment 40 of the armrest 38 may be provided in different ways. In a present example, fore and aft sidewalls 48 each include a support slot 60, with a long direction of each of the support slots 60 extending in a lateral direction. A corresponding pair of guide pins 62 each have a first end that is received in a respective support slot 60 and an opposed end that is affixed to the armrest 38. The guide pins 62, then, support the storage tray 46 while allowing for the storage tray 46 to be laterally slid into and out of the storage compartment 40 in the armrest 38, and are employed to limit the extent of travel laterally, either laterally inward (closed), laterally outward (open) or in both lateral directions. A spring 64 is illustrated mounted between the storage tray 46 and the interior of the armrest 38. The spring 64 biases the storage tray 46 laterally, for example, either laterally outward towards its open position or laterally inward towards its closed position. A latch 66 is employed to hold the storage tray 46 against the bias of the spring (i.e., either holding the storage tray 46 open or holding it closed). In the example of FIG. 8, the spring 64 is shown connecting at one end to the bottom 52 of the storage tray 46, again providing either an outward bias or an inward bias to the storage tray 46 relative to the storage compartment of the armrest.

Figure 9:
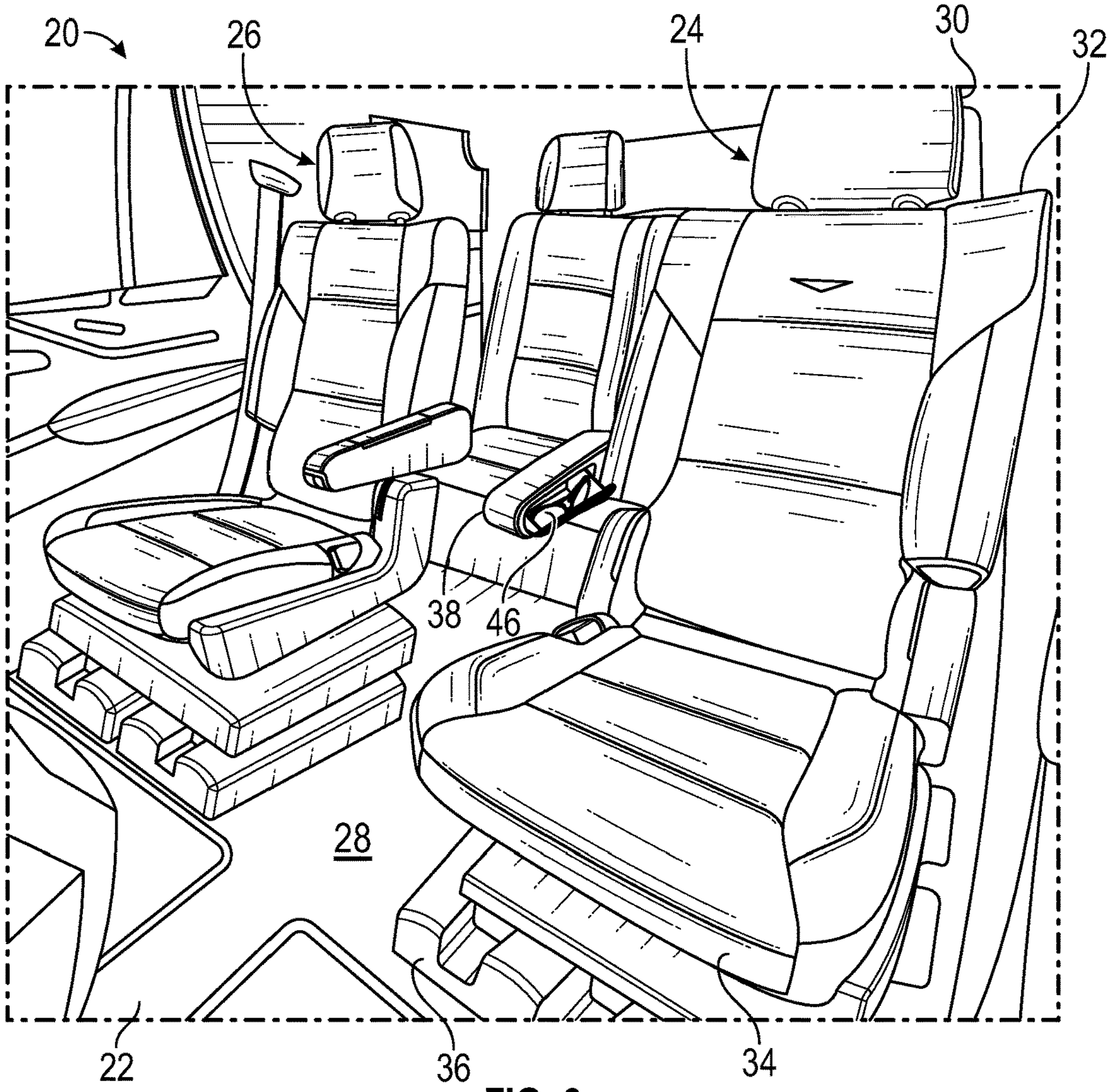
FIG. 9 is a schematic, perspective view of a portion of an interior of a vehicle.
Figure 10:
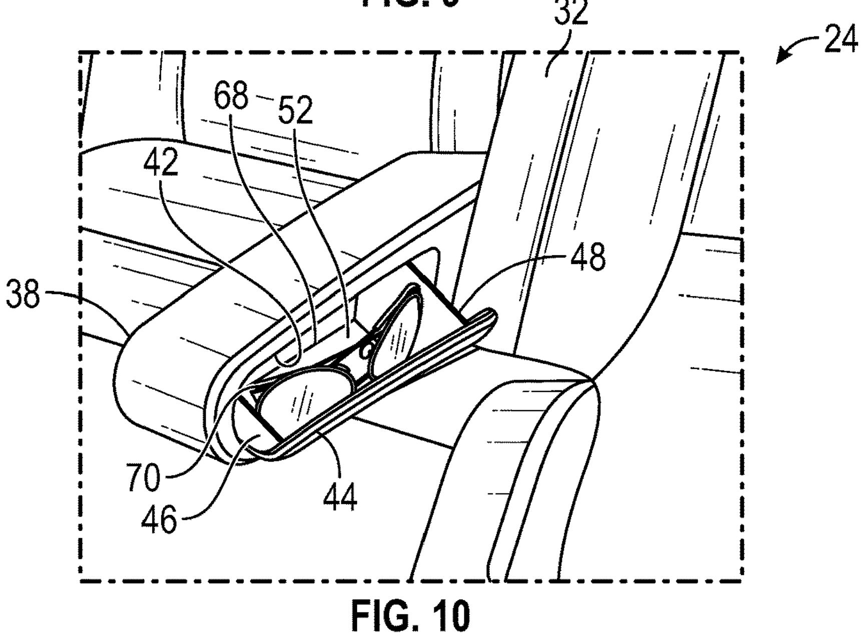
FIG. 10 is a schematic, perspective view of a portion of a vehicle seat assembly, with an armrest in a deployed position and a storage cover on the armrest in an open position.

Referring now to the example of FIGS. 9 and 10, the vehicle interior 22 of the vehicle 20 is illustrated. Since the apparatus of FIGS. 9 and 10 have many elements in common with those of FIGS. 1-8, and to avoid unnecessary repetition of the description, like reference numbers designate corresponding elements in the drawings and the detailed description of will be omitted. The armrest 38 includes a storage compartment 40 having an opening 42, which is closed by a storage cover 44 when in the closed position and open for access (for example, to eyeglasses 70) when the storage cover 44 is pivoted outward about a longitudinally extending hinge 68 to an open position. The hinge 68 is connected between the armrest 38 and the storage cover 44, and the armrest may be mounted on an individual vehicle seat assembly 24. The term longitudinally extending for the hinge means that, when the armrest 38 is in is deployed position (as illustrated in FIGS. 9 and 10), the storage cover 44 pivots about a generally longitudinally extending axis (with the hinge extending generally vertically when the armrest 38 is in its stowed position). The storage tray 46 includes a bottom 52 and one or more sidewalls 48 or, alternatively, just include the storage cover 44. A spring biases the storage tray 46 pivotally inward (closed) or pivotally outward (open) and includes a latch to retain the storage tray 46 against the bias of the spring. Electrical power may be provided within the storage compartment 40.

Figure 11:
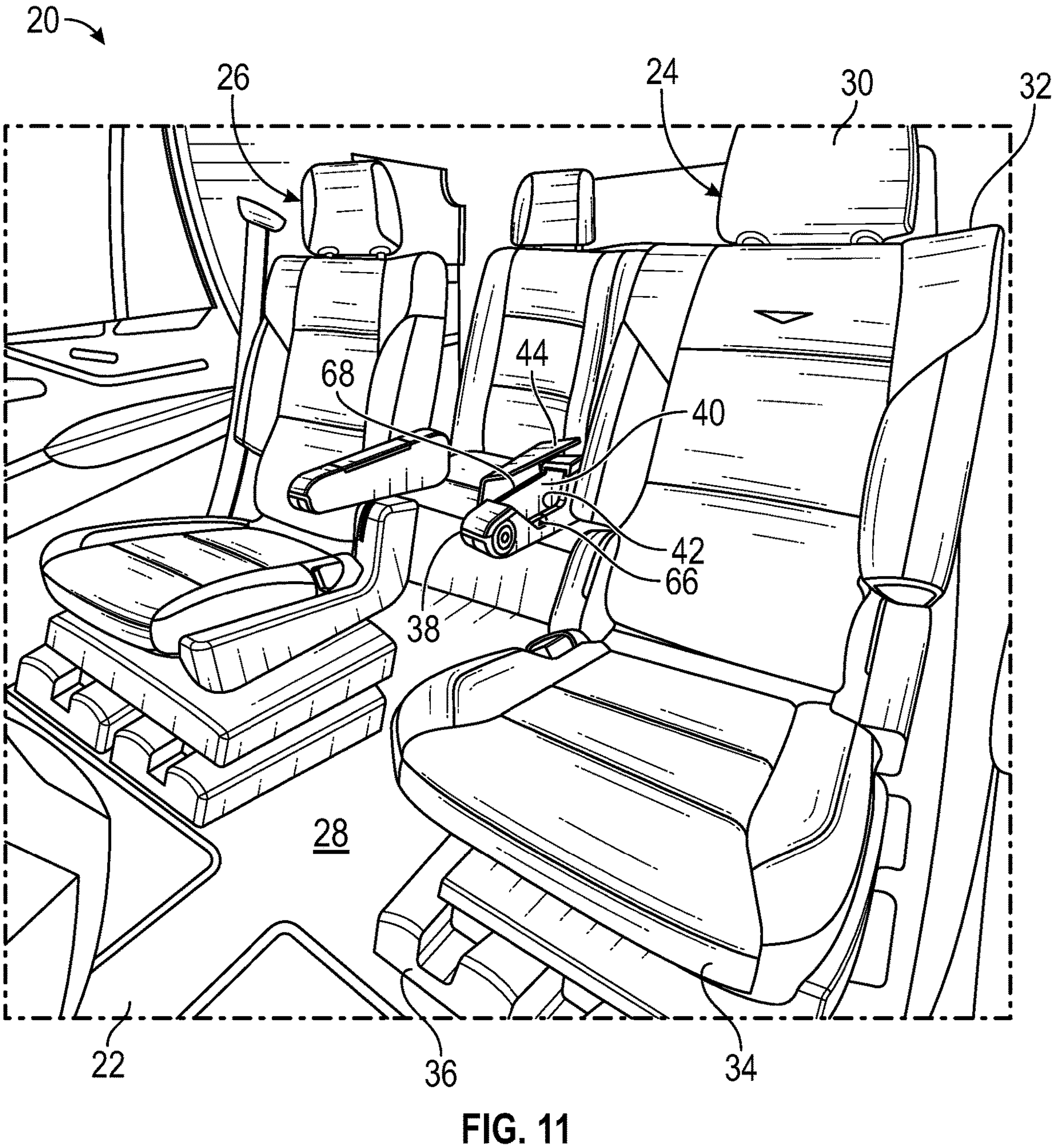
FIG. 11 is a schematic, perspective view of a portion of an interior of a vehicle.
Figure 12:
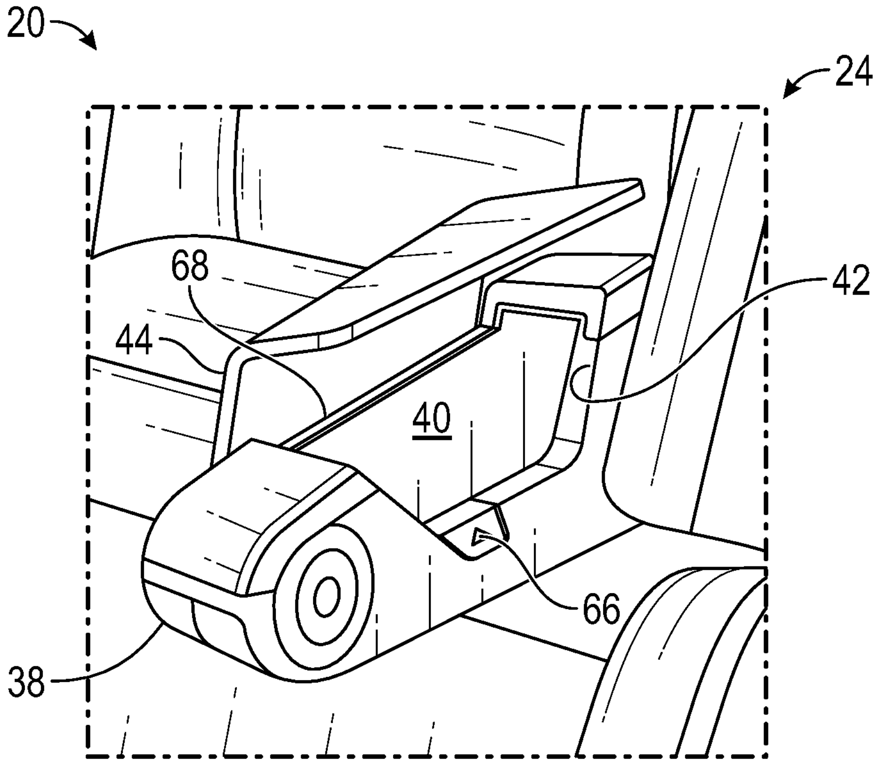
FIG. 12 is a schematic, perspective view of a portion of a vehicle seat assembly, with an armrest in a deployed position and a storage cover on the armrest in an open position.
Figure 13:
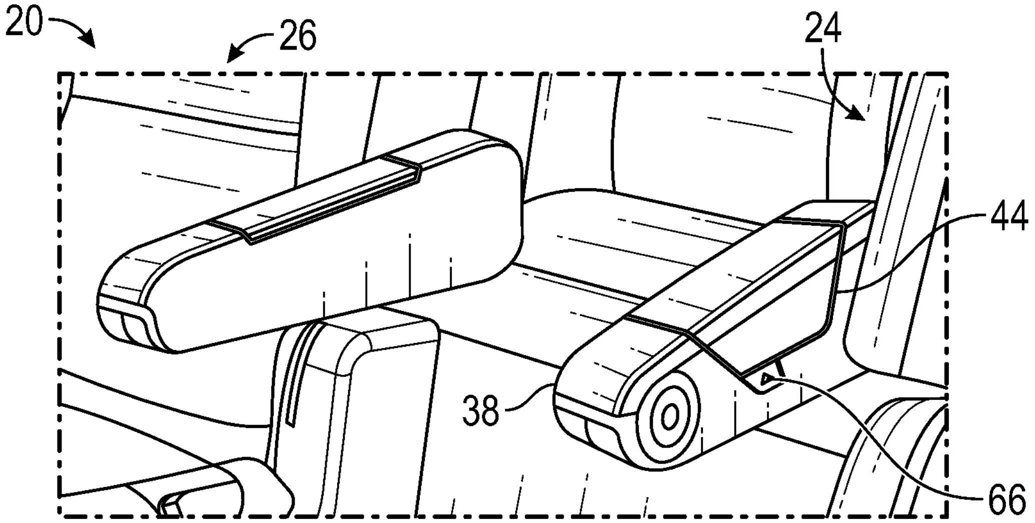
FIG. 13 is a schematic, perspective view of a portion of a vehicle seat assembly, with an armrest in a deployed position and a storage cover on the armrest in a closed position.

Referring new to the example of FIGS. 11-13, the vehicle interior 22 of the vehicle 20 is illustrated. Since the apparatus of FIGS. 11-13 have many elements in common with those of FIGS. 1-8, and to avoid unnecessary repetition of the description, like reference numbers designate corresponding elements in the drawings and the detailed description of will be omitted. The armrest 38 includes a storage compartment 40 having an opening 42, which is closed by a storage cover 44 when in the closed position (see FIG. 13) and open for access when the storage cover 44 is pivoted outward about a longitudinally extending hinge 68 to an open position (see FIGS. 11 and 12). The binge 68 is connected between the armrest 38 and the storage cover 44, and the armrest may be mounted on an individual vehicle seat assembly 24. The term longitudinally extending for the hinge means that, when the armrest 38 is in is deployed position (as illustrated in FIGS. 11-13), the storage cover 44 pivots about a generally longitudinally extending axis (with the hinge extending generally vertically when the armrest 38 is in its stowed position). The storage tray 46 may just include the storage cover 44, with a bottom of the storage compartment 40 acting as a bottom that supports items placed in the storage compartment 40 of the armrest 38. A spring may bias the storage cover 44 of the storage tray 46 pivotally inward (closed) or pivotally outward (open) and may include a latch 66 to retain the storage cover 44 of the storage tray 46 against the bias of the spring in the closed position and enables the storage cover 44 to move in the open position. Electrical power may be provided within the storage compartment 40.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A seat assembly for a vehicle, comprising:

an armrest connected to the seat assembly including:

an internal cavity defining a storage compartment;

an opening adjacent to the storage compartment configured to allow for access from outside of the armrest to the storage compartment; and a storage tray extending through the opening into the internal cavity, wherein the storage tray is laterally movable between a closed position where the storage tray is mostly or all of the way inserted into the storage compartment and essentially covers the opening, and an open position where the storage tray extends from the armrest to provide access to the tray, wherein a housing of the storage tray comprises a portion adapted to divide the storage tray in a first section and a second section, and wherein the second section is adapted to store an electronic device and the first section comprises a cavity adapted to receive a wireless charger within the internal cavity to facilitate charging of the electronic device.

2. The seat assembly of claim 1, further comprising a seatback, wherein the armrest is pivotally attached to the seatback.

3. The seat assembly of claim 2, wherein the seat assembly is a single vehicle seat assembly.

4. The seat assembly of claim 1, wherein the electrical device is mounted for sliding laterally with the storage tray.

5. The seat assembly of claim 1, wherein the storage tray includes a storage cover that is sized to cover the opening when the storage tray is in a closed position and the portion of the storage tray is spaced from the storage cover creating a gap that is sized to fit the electronic device.

6. The seat assembly of claim 1, wherein the armrest includes a latch to hold the storage tray in the closed position or the open position.

7. The seat assembly of claim 1, further including a biasing member in the storage compartment that biases the storage tray toward the open position.

8. The seat assembly of claim 1, further including a biasing member in the storage compartment that biases the storage tray toward the closed position.

9. The seat assembly of claim 1, wherein the storage tray includes a plurality of sidewalls that extend in a generally vertical direction when the armrest is in a deployed position and slide laterally with the storage tray between the open position and the closed position.

10. A seat assembly for a vehicle, comprising:

a seatback configured to be mounted in the vehicle; and an armrest pivotally mounted between a deployed position and a stowed position to the seat assembly including:

an internal cavity defining a storage compartment;

an opening adjacent to the storage compartment configured to allow for access from outside of the armrest to the storage compartment;

a storage cover pivotally attached to the armrest about a hinge, the storage cover pivotable between a closed position where the storage cover essentially covers the opening, and an open position where the storage cover extends from the armrest to provide access to the storage compartment, wherein when the armrest is pivotally mounted in the deployed position the storage cover extends in a direction parallel to the armrest and when the armrest is in the stowed position the storage cover of the storage compartment is concealed within a portion of the seatback and concealed away from an occupant of the seat assembly, and wherein, in the closed position, the storage cover extends on a lateral side of the armrest to cover the opening, or extends over both a portion of the lateral side and a portion of a top side of the armrest to cover the opening; and a latch that is mounted on the armrest adapted to enable the storage cover to move between the closed position and the open position.

11. The seat assembly of claim 10, wherein the seat assembly is a single vehicle seat assembly.

12. The seat assembly of claim 10, further comprising an electric device mounted in the storage compartment, and wherein the electrical device is mounted for pivoting with the storage cover.

13. The seat assembly of claim 12, wherein the electrical device is configured to charge a mobile phone located in the storage compartment.

14. The seat assembly of claim 10, wherein the storage cover is part of a storage tray that includes a plurality of sidewalls that extend in a generally vertical direction when the armrest is in the deployed position and the storage cover is in the closed position, which plurality of sidewalls pivot with the storage cover between the open position and the closed position.

15. The seat assembly of claim 9, wherein each sidewall of the plurality of sidewalls comprises a support slot extending in a lateral direction.

16. The seat assembly of claim 15, wherein each sidewall of the plurality of sidewalls further comprises a guide pin comprising a first end and a second end, and wherein the support slot is adapted to receive the first end and the armrest is adapted to receive the second end of the guide pin.

17. The seat assembly of claim 10, wherein when the armrest is in the deployed position the storage cover is pivotally mounted to the hinge along a longitudinal pivot axis, and when the armrest is in the stowed position the storage cover is pivotally mounted to the hinge along a vertical pivot axis.

* * * * *